Feb. 5, 1935.  R. C. LASSIAT  1,989,935
TEMPERATURE CONTROL OF CATALYTIC REACTIONS
Filed April 28, 1933  3 Sheets-Sheet 2
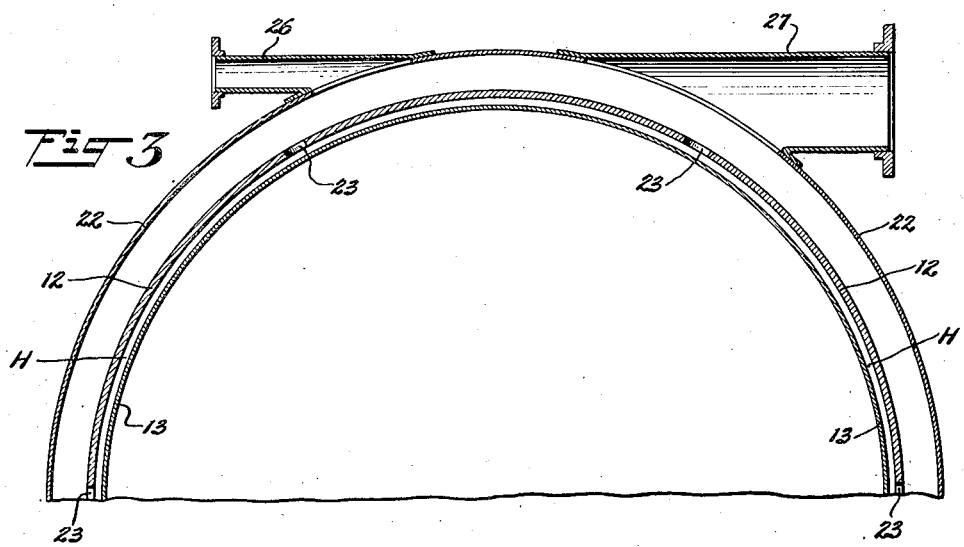
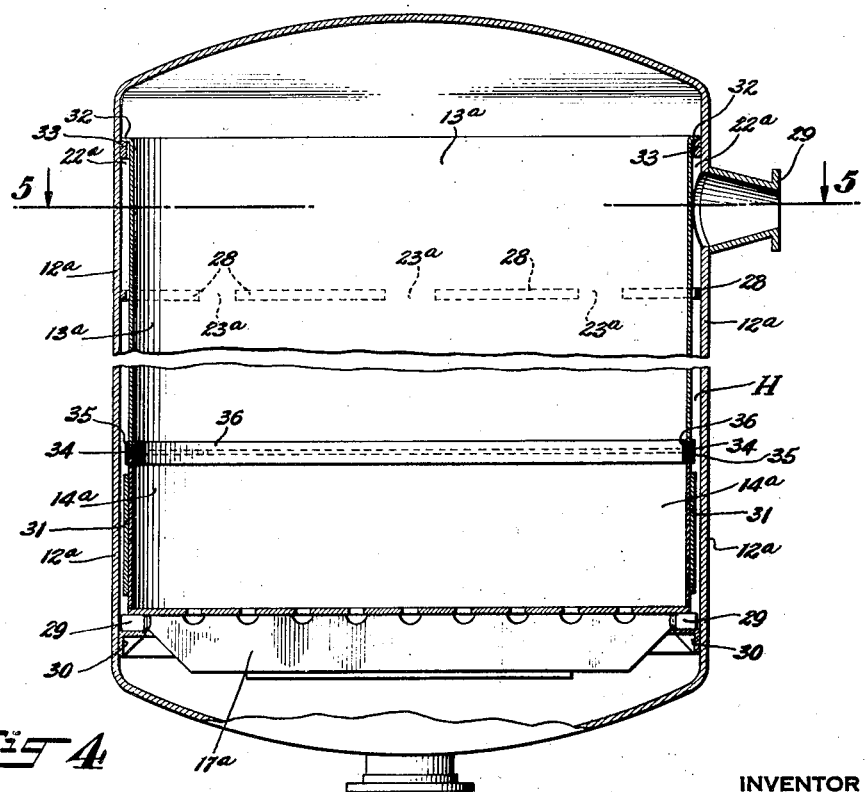
INVENTOR
Raymond C. Lassiat.
BY
Ira L. Nickerson
ATTORNEY

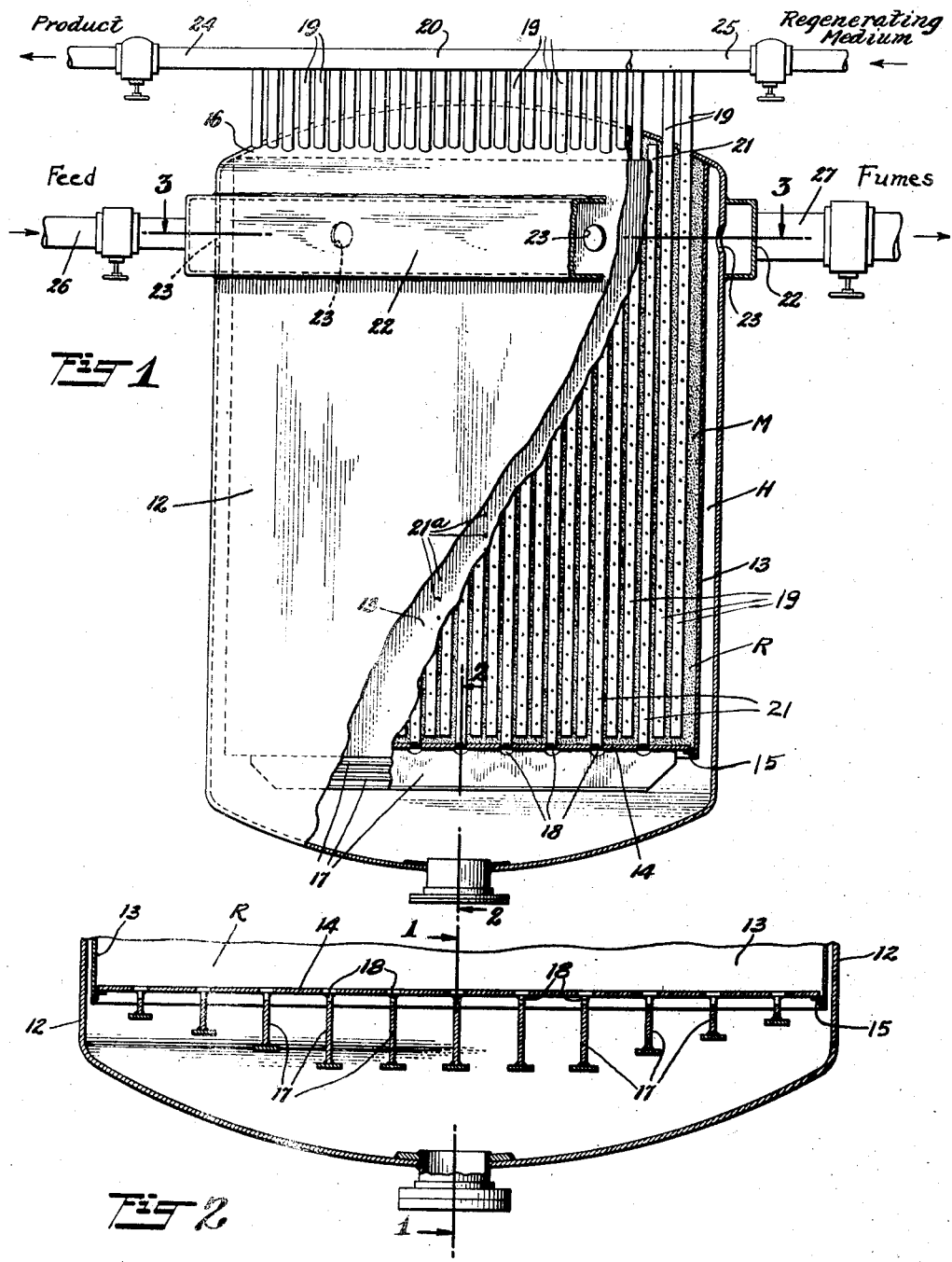

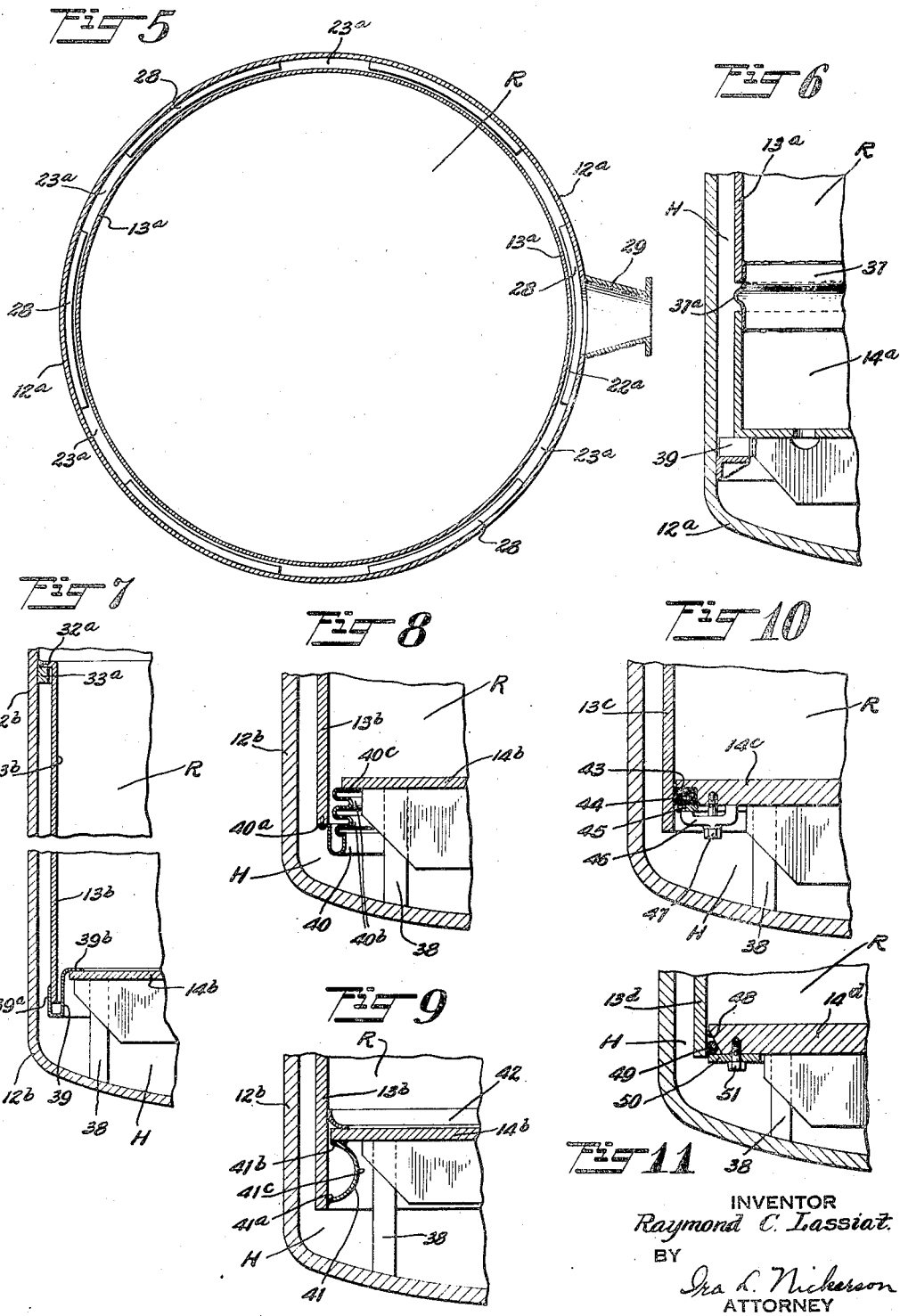

Patented Feb. 5, 1935

1,989,935

UNITED STATES PATENT OFFICE 1,989,935

TEMPERATURE CONTROL OF CATALYTIC REACTIONS

Raymond C. Lassiat, Woodbury, N. J., assignor to Houdry Process Corporation, Dover, Del., a corporation of Delaware Application April 28, 1933, Serial No. 668,325

17 Claims. (Cl. 23—288)

This invention relates to the use of contact masses for effecting chemical reactions, both exothermic and endothermic. More particularly, it has to do with the maintenance of the entire contact mass at the reaction temperature, also with transitions of the entire mass from one reaction temperature to another, as from operating temperature to regenerating temperature, and vice versa.

When a converter is operated at low temperatures, heat losses through the walls of the casing are quite small and can be effectively minimized by insulation. At high temperature, however, the heat losses become extreme, and even with the best of insulation, it has been very difficult, if not impossible, to keep at proper temperature that portion of the mass which lies against the converter wall and for a distance up to six inches therefrom. This condition has impaired the yield and quality of the product and interfered with the regeneration of the contact mass.

One object of the invention is to reduce greatly, if not to avoid entirely, the difficulties resulting from cold areas in the contact mass due to heat losses through the converter casing. Another object is to maintain the peripheral portion of the contact mass at an even temperature with the remainder of the mass. Another object is to secure substantial uniformity of temperature conditions throughout the contact mass during and after transitions from one reaction temperature to another. Still other objects will be apparent from the detailed discussion of the invention which follows.

The invention involves the application of heat to the converter walls to counteract heat losses therefrom or thereto by radiation, convection and conduction. While the heat so supplied may be derived from any source, it is particularly desirable, from the standpoint of economics, that it come from materials about to take part in the reaction or from the products resulting from the reaction. The means for directing heat to the converter shell may take the form of an envelope applied to the exterior of the shell so as to enclose at least the side walls of the converter, or the converter may be inserted within an outer shell. The converter thus has a double shell, and the space between the two shells serves as a passageway for the heating medium, which by preference comprises the fluids entering or leaving the catalytic chamber during both the periods of conversion and the periods of regeneration. Uniform temperatures within the converter may be produced by uniform and equal distribution of fluids within and throughout the mass by the use of apertured inlet and outlet conduits embedded in the contact mass in parallel juxtaposition and in symmetrical disposition, as disclosed in certain copending applications, such, for example, as that of Alfred Joseph, Serial No. 440,199½, filed March 31, 1930, for "Catalytic apparatus", and that of Eugene J. Houdry, Serial No. 611,362, filed May 14, 1932, entitled "Fluid distribution in contact masses".

As to specific structural details of the double walled converter, the invention contemplates considerable variation. In one form, the shell containing the contact mass may be suspended within the outer shell or envelope. In another form, the inner shell is supported at spaced points by the outer shell, as at top and bottom, in which case suitable provision for relative movement due to temperature changes is necessary. The inner container is then preferably made in at least two parts with suitable provision for relative movement due to temperature changes, as an expansion joint which is substantially fluid-tight. Other features of the invention involve the heat connections and controls, the even distribution of the heating medium in the space provided therefor in the double-shelled converter, etc.

In order to illustrate the invention and the manner of its use, concrete embodiments thereof are disclosed in the accompanying drawings, in which:

Fig. 1 is a side elevational view partly cut away and partly in section on the line 1—1 of Fig. 2 of one form of double shelled converter;

Fig. 2 is a fragmentary vertical sectional view on an enlarged scale on the line 2—2 of Fig. 1;

Fig. 3 is a fragmentary horizontal sectional view on the same scale as Fig. 2, but on the line 3—3 of Fig. 1;

Fig. 4 is a vertical sectional view of a modified form of converter;

Fig. 5 is a horizontal sectional view on the line 5—5 of Fig. 4;

Fig. 6 is a fragmentary sectional view of the converter shown in Fig. 4, but showing a different form of expansion joint;

Figs. 7, 8 and 9 are fragmentary sectional views similar to Fig. 6, but showing slightly different forms of converters and variations in expansion joints between the relatively movable parts of the inner shell; and Figs. 10 and 11 are fragmentary sectional views similar to Figs. 7, 8 and 9, but showing packing arrangements between the movable parts, instead of flexible joints.

(For the sake of clearness, details of the contents of the reaction chamber have been omitted from Figs. 2 to 11, inclusive.)

The converters herein shown are of double shelled construction, providing an inner reaction chamber R and an outer chamber H enclosing the greater part of the walls of the reaction chamber so as to be utilized for supplying heat to or extracting heat from these walls and the adjacent portions of the contact mass in the reaction chamber. In the form shown in Figs. 1, 2 and 3, the converter has an outer shell 12, within which is suspended in spaced relation thereto an inner shell 13 having a perforated bottom 14 welded to or otherwise supported on a flange 15 on the inner face of shell 13. Outer shell 12 has a perforated top 16, which closes the upper end of reaction chamber R, and to which inner shell 13 is secured in a fluid-tight manner, as by welding. Hence in this converter reaction chamber R is formed or bounded by top 16 of outer shell 12, by the cylindrical inner shell 13, and by bottom plate 14, the latter supporting the contact material, such as mass M, which is deposited within the reaction chamber R. Bottom plate 14 may be stiffened and held against warping or buckling under temperature changes by a series of webs 17 secured to the underside thereof in any suitable manner, as by welding, and extending across the bottom in parallel relation, as indicated in Fig. 2. When webs 17 extend under the perforations in bottom plate 14, they are recessed or cut away, as indicated at 18, for a purpose presently to be described. Inner shell 13 and bottom plate 14 form the inner walls of outer chamber H, and bottom 14 serves as the dividing wall between the two chambers. Since bottom plate 14 is perforated, it also serves to establish communication between the two chambers.

The contact mass M, which is deposited in reaction chamber R, may be of any known or suitable material for effecting the desired reaction. Hence it may comprise inert material, absorptive material, or adsorptive material, or any desired combinations of such materials. While the material may be in finely divided form, it is preferably in bits, fragments or molded pieces of substantially uniform size and shape to facilitate clearing the mass at intervals of contaminants. When material having catalytic activity is used, reactivation or regeneration of the mass may be effected by oxidation. Distribution of the reactants, such as the material to be transformed or treated or the regenerating medium, may be effected in and throughout the mass by any suitable or known means. In Fig. 1, the means illustrated comprise a series of perforated conduits 19 extending from a header 20 through the perforations in top 16, and a series of similar perforated conduits 21 mounted in the perforations in the bottom plate 14. Conduits 19 and 21 extend into and through contact mass M in uniform parallel disposition, after the manner disclosed in the aforesaid copending Houdry application Serial No. 611,362, there being substantially twice as many of the first group as of the second. Either group of conduits presents a surface per unit of length of the reaction chamber greater than the surface of the wall enclosing the chamber. Recesses 18 in webs 17 permit free movement of fluid with respect to chamber H into or out of conduits 21.

Header 20 serves as an inlet or discharge header for the reaction chamber R, since it communicates directly therewith through conduits 19. Outer chamber H has a corresponding header 22, with which communication is established by a series of ports 23 in outer shell 12. Header 22 may take a variety of forms. For example, it could be an annular conduit entirely independent of the converter encircling the same in spaced relation thereto with branch pipes connected to ports 23. In Fig. 1, however, it is shown as an annular channel shaped plate with its open face welded to outer shell 12 over ports 23. Header 20 preferably has two valved connections 24 and 25 (Fig. 1). Similarly, manifold 22 has corresponding valved connections 26 and 27, which may be tangentially joined thereto, as indicated in Fig. 3. Only one of each set of connections will be used at one time, one for an inlet and the other for an outlet. For example, if the material is to pass first to reaction chamber R, it may be admitted either by connection 24 or 25 to manifold 20, pass into conduits 19, where it is distributed uniformly and simultaneously throughout contact mass M, enter conduits 21 through the nearest ports in the latter, and issue through bottom plate 14 into outer chamber H, whence it passes through ports 23 into manifold 22 to escape through either connection 26 or 27. On the other hand, the material may be first sent either by connection 26 or 27 into manifold 22, thence through ports 23 into outer chamber H, where it circulates about the inner shell and passes through the perforations in bottom 14 into conduits 21, which discharge it simultaneously and uniformly into the contact mass in reaction chamber R, the products from the reaction escaping through the nearest ports in conduits 19, which conduct them into manifold 20, whence they may escape through either connection 24 or 25. While the material may follow either course, experience indicates that, when the reaction is exothermic, the course first described is preferable, while with an endothermic reaction, the second course has certain advantages.

One use of the apparatus shown in Figs. 1, 2 and 3 is in the conversion of high boiling hydrocarbons, such as heavy petroleum distillates, into low boiling hydrocarbons, such as gasoline. The reaction being endothermic, the fresh feed may be admitted through connection 26 to manifold 22 and outer chamber H at a temperature sufficiently above the desired reaction temperature (775° to 925° F.) to insure that the walls of reaction chamber R and the adjacent part of mass M are maintained at the desired temperature by the incoming charge, the products of the reaction escaping through manifold 20 and connection 24. When regeneration of contact mass M (molded pieces of activated clay with or without other adsorptive material) is necessary, connections 24 and 26 are closed, and a regenerating medium, such as fresh air, diluted, if desired, with flue gas or steam, is admitted at low or atmospheric temperature by connection 25 into manifold 20, where it is discharged into mass M. Oxidation takes place within the mass, with the regenerating medium supplied at the proper rate so that the average reaction temperature shall not be much above 1100° F., and the hot fumes of the reaction escape into outer chamber H, where they pass around the walls of the reaction chamber and prevent an undue drop in temperature by radiation and conduction, the fumes finally escaping through manifold 20 and connection 27.

While the cylindrical portion 13 of the inner shell will normally be imperforate so that all communication between chambers R and H will be through bottom plate 14, small perforations such as 21a (Fig. 1) corresponding to the apertures in conduits 21 may be provided in shell 13 when needed to secure uniform distribution of fluids within and throughout contact mass M. A condition making the use of such ports desirable would arise when the disposition of conduits 19 and 21 is such that a layer of catalyst of some thickness is between shell 13 and one or more of conduits 19 without an intervening conduit 21.

Figs. 4 and 5 illustrate a different manifolding arrangement for the outer chamber. In this instance, the upper part of chamber H is blocked off or restricted by a series of arcuate members or baffles 28 disposed in the same horizontal plane and leaving gaps or spaces 23a therebetween which correspond to the ports 23 of Figs. 1 and 3. A connection 29 may be provided through outer shell 12a for admitting fluid to or discharging fluid from the manifolding chamber 22a defined by baffles 28 (Fig. 4). Since the fluid stream follows the path of least resistance, it will tend to distribute itself entirely around manifold chamber 22a before it passes to any considerable extent through the restricted areas 23a between baffles 28.

Instead of forming the inner shell substantially in one piece, after the manner disclosed in Figs. 1 and 2, the modification of the invention disclosed in Fig. 4 provides an upper section 13a and a lower or bottom section 14a. Lower section 14a rests upon a series of transverse web members 17a, the ends of which are welded or otherwise secured to blocks 29, which rest upon an annular flange or support 30 secured to outer shell 12a at its lower end. Blocks 29 may be secured or not, as desired, to lower shell section 14a of the reaction chamber, but they are in spaced relation to permit free movement of fluid between the bottom and side portions of outer chamber H. Bars 31 may be applied at intervals to the outer face of bottom section 14a to prevent shifting or sidewise movement of the inner shell during shipment. Upper section 13a of the inner shell may be formed with an outwardly flared upper edge 32 adapted to rest upon and to be welded or otherwise secured to a supporting flange 33 on the inner face of outer shell 12a. Relative movement between sections 13a and 14a of the inner shell, due to temperature changes, are provided for by an expansion joint 34 therebetween of any suitable or desired type capable of making a substantially fluid-tight connection. The joint shown comprises concentric plates 35 and 36 secured either to upper section 13a or lower section 14a and providing an annular groove in which the opposing edge of the other section may slide. Fig. 6 illustrates a different type of expansion joint comprising an annular plate 37 of flexible metal having its upper and lower portions secured, as by welding, to upper section 13a and lower section 14a respectively, of the inner shell. The aligned edges of the two sections of the shell are suitably spaced apart to provide room for the outwardly bowed intermediate section 37a of plate 37.

In Figs. 7, 8 and 9, the inner shell comprises a cylindrical section 13b having an outwardly flared upper end 32a resting on a supporting flange 33a on outer shell 12b (Fig. 7), and a bottom plate 14b which is suitably supported from the bottom of outer shell 12b as by posts 38. The free end of section 13b of the inner shell extends below bottom plate 14b, and a flexible strip or plate connects the two to form a fluid-tight expansion joint somewhat after the manner of the joint 37 shown in Fig. 6. In Fig. 7, the flexible strip 39 forming the joint has one edge 39a welded or otherwise secured to the outer face of section 13b. The strip depends therefrom and is reversely bent to extend upwardly in the space between section 13b and plate 14b, with its other edge horizontally bent, as indicated at 39b, and secured to the upper face of bottom plate 14b. In the form shown in Fig. 8, flexible strip 40, which forms the expansion joint, has one edge formed as a horizontal flange 40a secured to the under face of section 13b. The strip depends therefrom and then is reversely bent, thereafter to have a series of horizontal reverse bends 40b in the form of a bellows, the inner edge forming a horizontally disposed flange 40c secured as by welding to the under face of bottom plate 14b. In Fig. 9, the fluid-tight flexible joint is formed by a ring 41 of flexible sheet material with outwardly extending ends or edges 41a and 41b and an inwardly bent rounded center section 41c so as to appear convex in transverse section. One edge, such as 41a, is welded or otherwise secured to the inner face of section 13b beneath bottom plate 14b, while the other edge, 41b, is welded or otherwise secured to the under face of plate 14b. To prevent pieces of the contact mass from working through the space between bottom plate 14b and cylindrical section 13b of the inner shell, a spring ring 42 may be applied to cover this joint. While ring 42 may be of any cross sectional formation, that shown appears as arcuate and generally concave. A ring, such as 42, may be used, if desired, in connection with the modifications shown in Figs. 7, 8, 10 and 11.

In place of an expansion joint formed of flexible sheet material, a packed joint may be used when the temperature or pressure conditions are not too severe. Fig. 10 shows a structural arrangement generally similar to that shown in Figs. 7, 8 and 9, wherein the inner casing comprises a cylindrical section 13c and a base plate 14c. Section 13c extends below base plate 14c, and the latter is cut away to form an annular recess 43 on its under side. In this recess is disposed a roll 44 of packing material, preferably of fibrous nature, comprising or containing asbestos. A flat ring 45 engages roll 44 from below, and one foot of a U-shaped clamping member 46 applies pressure to ring 45 through the action of a screw bolt 47.

The packing arrangement shown in Fig. 11 is similar to that shown in Fig. 10, save that the edge of bottom plate 14d is cut away at an angle to provide a wedging face 48 which forces a metallic packing ring 49 into fluid-tight engagement with the inner wall of upper section 13d of the inner shell. A retaining ring 50, secured by machine screws 51, prevents displacement of packing ring 49.

I claim as my invention:

1. Process of controlling the reaction temperatures of a contact mass which is alternately on stream and in regeneration which comprises passing fluid reactants around the walls of the chamber containing the contact mass and then into the contact mass during on stream periods, passing the reaction products of regeneration around the walls of the chamber during regenerating periods, and effecting uniform distribution of the regenerating medium within and throughout the mass during regenerating periods.

2. Process of controlling the reaction temperatures of a contact mass which is alternately on stream and in regeneration by oxidation which comprises passing fluid reactants or reaction products at reaction temperatures around the walls of the chamber containing the contact mass during on stream periods, passing the reaction products of regeneration by oxidation at regenerating temperature around the walls of the chamber during regenerating periods, and effecting uniform distribution of the fluid reactants and of the regenerating medium within and throughout the mass during both said periods.

3. Process of operating a double shelled converter having an inner chamber containing a contact mass capable of regeneration in situ and an outer chamber at least partly enclosing said inner chamber which comprises sending the material to be transformed first through said outer chamber and then into said inner chamber until the activity of the mass is reduced by the contaminants deposited therein, stopping the feed of the material, thereafter immediately charging a regenerating medium first into said inner chamber and thereafter out through said outer chamber, stopping the regenerating medium when the contact mass is freed of contaminants, and repeating the above steps.

4. Process of operating a double shelled converter having an inner chamber containing a contact mass capable of regeneration in situ by oxidation and an outer chamber at least partly enclosing said inner chamber which comprises sending the material to be transformed at a temperature above the reaction temperature first through said outer chamber and then into said inner chamber until the activity of the mass is reduced by the contaminants deposited therein, stopping the feed of the material, immediately charging an oxidizing medium at a temperature below the reaction temperature first into said inner chamber and thereafter out through said outer chamber, stopping the oxidizing medium when the contact mass is freed of contaminants, and repeating the above steps.

5. A double shelled converter for effecting chemical reactions and providing inner and outer chambers, said outer chamber at least partly enclosing said inner chamber, a contact mass in said inner chamber, perforated conduits in said inner chamber embedded in said contact mass, one of said conduits establishing communication between said inner and outer chambers, another of said conduits having a connection extending outside said converter to serve as an inlet for a reactant fluid or as an outlet for the products of a reaction.

6. A converter for effecting chemical reactions comprising an outer shell, an inner shell suspended from the upper part of said outer shell providing a reaction chamber for containing a contact mass, said inner shell being in spaced relation to said outer shell to provide an outer chamber at least partly enclosing said inner chamber, said inner shell having perforations directly connecting said chambers, and fluid conducting means entering said reaction chamber from the exterior of said outer chamber for distributing fluid within and throughout the interior of the contact mass.

7. A double shelled converter for effecting chemical reactions and providing inner and outer chambers, said outer chamber at least partly enclosing said inner chamber, a contact mass in said inner chamber, a series of perforated conduits in said inner chamber embedded in said contact mass and interconnecting said chambers, and inlet and outlet connections other than said conduits for each of said chambers.

8. A double shelled converter for effecting chemical reactions and providing inner and outer chambers, said outer chamber at least partly enclosing said inner chamber, a contact mass in said inner chamber, two series of perforated conduits in said inner chamber embedded in said contact mass, one of said series of conduits communicating with said outer chamber, and a manifold on the exterior of said converter connected to the other of said series of conduits.

9. A converter having an inner shell containing a contact mass, an outer shell enclosing the sides and one end of said inner shell in a fluid-tight manner, said inner shell having a perforated end to establish communication between the interiors of said shells, a connection for admitting fluid to said outer shell, and baffle members disposed in spaced transverse alignment within said outer shell to form an annular chamber for equalizing the distribution of fluid from said connection before the same is admitted to said inner shell.

10. A converter having an inner shell containing a contact mass, an outer shell forming a closure for one end of said inner shell and enclosing in spaced relation and in a fluid-tight manner the sides and other end of said inner shell, said inner shell having said other end perforated to establish communication between the interiors of said shells, and a series of perforated conduits embedded in said contact mass and communicating through said perforated end of said inner shell with the interior of said outer shell.

11. A converter for effecting chemical reactions comprising an outer shell, an inner shell in spaced relation to said outer shell and providing a reaction chamber for containing a contact mass, said chamber being formed by said inner shell and the top of said outer shell, perforations in said inner shell interconnecting said reaction chamber and the chamber surrounding the latter formed by said outer shell, said inner shell being formed in sections, and means providing an expansion joint between said sections of said inner shell.

12. A converter for effecting chemical reactions comprising an outer shell, an inner shell in spaced relation to said outer shell and providing a reaction chamber for containing a contact mass, said chamber being formed by said inner shell and the top of said outer shell, perforations in said inner shell interconnecting said reaction chamber and the chamber surrounding the latter formed by said outer shell, said inner shell being formed in sections independently supported by said outer shell, and means making a fluid-tight connection between said sections but permitting relative movement of the latter.

13. A converter for effecting chemical reactions comprising an outer shell, an inner shell in spaced relation to said outer shell and providing a reaction chamber for containing a contact mass, said chamber being formed by said inner shell and the top of said outer shell, perforations in said inner shell interconnecting said reaction chamber and the chamber surrounding the latter formed by said outer shell, said inner shell being formed in sections independently supported by said outer shell, and flexible sheet material interconnecting said sections in a fluid tight manner to permit limited relative movement thereof.

14. A converter for effecting chemical reactions comprising an outer shell, an inner member depending from the upper portion of said shell in spaced relation to the latter, a bottom plate supported at the lower end of said member by said outer shell, and sheet material attached to both said plate and member and having an intermediate bowed or return bent section thereby to divide the space within said converter into an inner reaction chamber and an outer chamber and to permit relative movement of said member and plate.

15. A converter for effecting chemical reactions comprising an outer shell, an inner member depending from the upper portion of said shell in spaced relation to the latter, a bottom plate supported at the lower end of said member by said outer shell, said member overlapping said plate, and means providing a slidable packed joint between said plate and said member.

16. A converter for effecting chemical reactions comprising an outer shell, an inner cylindrical member depending from the upper portion of said shell in spaced relation to the latter, a bottom plate supported at the lower end of said member by said outer shell, and an annulus of flexible sheet material connecting said plate to said member in a fluid-tight manner but permitting relative movement of said plate and member thereby to form a reaction chamber for containing a contact mass.

17. A converter for effecting chemical reactions comprising an outer shell, an inner cylindrical member depending from the upper portion of said shell in spaced relation to the latter, a bottom plate supported at the lower end of said member by said outer shell, said member together with said plate and the top of said outer shell forming a reaction chamber for containing a contact mass, means on the under face of said plate providing an expansion joint with said member, and means engaging the upper face of said plate for preventing the contact mass from finding its way between said plate and said member.

RAYMOND C. LASSIAT.